US006172699B1

(12) United States Patent
Ohashi

(10) Patent No.: US 6,172,699 B1
(45) Date of Patent: Jan. 9, 2001

(54) THERMAL PRINTING SYSTEM HAVING FUNCTION FOR PREVENTING OVER HEATING OF THERMAL HEAD

(75) Inventor: Takeo Ohashi, Isehara (JP)

(73) Assignee: Ricoh Company, Ltd., Tokyo (JP)

(*) Notice: Under 35 U.S.C. 154(b), the term of this patent shall be extended for 0 days.

(21) Appl. No.: 09/399,269

(22) Filed: Sep. 17, 1999

Related U.S. Application Data

(62) Division of application No. 08/689,387, filed on Aug. 12, 1996, which is a continuation of application No. 08/161,941, filed on Dec. 2, 1993.

(30) Foreign Application Priority Data

Dec. 8, 1992 (JP) .................................................. 4-328064

(51) Int. Cl.[7] .............................. B41J 2/32; H04N 1/23; H04N 1/32

(52) U.S. Cl. .......................... 347/171; 347/194; 358/439; 358/468

(58) Field of Search .................................... 347/171, 194; 358/401, 434, 436, 439, 468

(56) References Cited

U.S. PATENT DOCUMENTS

| | | |
|---|---|---|
| 4,540,295 | 9/1985 | Okunishi et al. . |
| 5,220,350 | 6/1993 | Fujii . |
| 5,353,044 | 10/1994 | Nakano et al. . |
| 5,361,090 | 11/1994 | Suzuki et al. . |

FOREIGN PATENT DOCUMENTS

| | | |
|---|---|---|
| 59-187876 | 10/1984 | (JP) . |
| 63-40814 | 2/1988 | (JP) . |
| 1-25356 | 5/1988 | (JP) . |
| 2-68667 | 11/1988 | (JP) . |

*Primary Examiner*—Huan Tran
(74) *Attorney, Agent, or Firm*—Cooper & Dunham LLP

(57) ABSTRACT

An input unit inputs printing data. A detecting unit detects a current temperature of a thermal head which is used to print information associated with the printing data. A memory unit stores, instead of prints, a data packet of the printing data if it is determined that the current temperature of the thermal head provided by the detecting unit results in controlling the thermal head so it is not used for printing out the data packet of the printing data.

3 Claims, 8 Drawing Sheets

THERMAL PRINTING SYSTEM HAVING FUNCTION FOR PREVENTING OVER HEATING OF THERMAL HEAD

This is a divisional of application Ser. No. 08/689,387 filed Aug. 12, 1996 which is a continuation of application Ser. No. 08/161,941 filed Dec. 2, 1993.

BACKGROUND OF THE INVENTION

The present invention relates to a thermal printing system (or thermal printer) using a thermal head for changing, according to input printing data, a color of proper parts of a recording sheet by causing the thermal head to come in contact with the recording sheet appropriately so as to print an image corresponding to the input printing data on the recording sheet. Such a recording sheet comprises a paper which is normally specially coated so that the special coating discolors when it is heated. One example of such a thermal printing system comprises a facsimile apparatus. The present invention in particular relates to a thermal printing system having a function for preventing the thermal head from being overly heated and having a function for preventing partial loss of printed information. Such partial loss of printed information may occur because the above-mentioned thermal-head over heating prevention function prevents the thermal head from further heated due to excessive rising of the temperature of the thermal head being detected.

In one example of such a facsimile apparatus according to related art, temperature detecting means such as a thermistor is provided for detecting a temperature of the thermal head. If the detected temperature of the thermal head reaches a predetermined value, operation of a printing strobe is terminated so as to stop heating of the thermal head. As a result of the heating stoppage, overly heating of the thermal head is prevented.

However, termination of the operation of the printing strobe such as mentioned above may result in a partial loss of printed information if the printing strobe operation termination occurs in the middle of the printing work. On the other hand, it may be possible, in order to prevent the termination of the operation of the printing strobe, to provide measures for reducing heat load applied to the thermal head while the printing strobe is operated. Such measures may comprise, for example, changing the resistance value and/or electric current associated with the thermal head, and/or adding a heat radiation plate into the thermal head. These measures are used for preventing heat from accumulating in the thermal head and thus for preventing the thermal head from being overheated. In this method, partial loss of printed information can be prevented but the thus printed information may become degraded due to insufficient heating of the recording (or printing) paper by means of the thermal head. Such insufficient heating may result from the above-mentioned reduction of the energy supplied to the thermal head.

Further, in the facsimile apparatus according to the related art, a printing strobe-width or strobe time-width (hereinafter used to refer to, a time period for which energy is applied to the thermal head) is determined in response to the magnitude of the detected temperature of the thermal head. Thus, a uniformity in the printing density can be realized even though the temperature of the thermal head tends to vary due to certain reasons, such as variation in ambient temperature and variation of current and/or voltage of the power source used for heating the thermal head.

In this method, however, a problem may occur in a case where a portable power source is utilized for heating the thermal head in the facsimile apparatus. The problem may occur due to a variation in the current and voltage of the portable power source, which variation occurs significantly in particular in a power source such as a portable power source. It is difficult to maintain a proper printing density only by altering the printing strobe time-width to correct the variation in the thermal head temperature due to the existence of such a significant variation in the current and voltage of the power source for heating the thermal head.

SUMMARY OF THE INVENTION

An object of the present invention is to provide a thermal printing system in which the problems mentioned hereinbefore are eliminated. As a result, proper protection of the thermal head from over-heating and prevention of partial loss of printed information is simultaneously ensured.

To achieve the object of the present invention, a thermal printing system according to the present invention comprises:

input means for inputting printing data;

detecting means for detecting a current temperature of a thermal head which is used to print information associated with said printing data;

memory means for storing, instead of printing, a data packet of said printing data if it is determined that said current temperature of said thermal head provided by said detecting means results in controlling said thermal head so it is not used to print out said data packet of the printing data.

The printing data once stored in the memory means is then used to print the information associated therewith, the printing being started after the current temperature of the thermal head becomes lowered sufficiently. As a result, partial loss of printed information can be prevented and better printing can be realized.

Another thermal printing system according to the present invention comprises:

detecting means for detecting a current temperature of a thermal head which is used to print information associated with printing data; and transfer controlling means for reducing a data transfer rate, at which said printing data is transferred from outside to said thermal printing system, if the current temperature of said thermal head is in a predetermined range.

The increasing of the thermal head temperature may be controlled due to the data-transfer-rate reduction. As a result, partial loss of printed information can be prevented and better printing can be realized.

Another thermal printing system according to the present invention comprises:

detecting means for detecting a current temperature of a thermal head which is used to print information associated with printing data; and transfer repeating means which, instead of causing other printing data to be transferred to said thermal printing system from outside, causes at least a last part of once transferred printing data to be transferred again, after the current temperature of said thermal head is in a predetermined range.

During the time that the transfer of the other printing data is halted and the part of the once transferred data is being transferred again, the printing work may be halted. Thus, the increasing of the thermal head temperature may be controlled. As a result, by using an appropriate printing strobe time-width, better printing is obtained.

Another thermal printing system according to the present invention comprises:

detecting means for detecting a current temperature of a thermal head which is used to print information associated with printing data; and strobe controlling means for controlling a strobe time width during which said thermal head is heated so as to print the information associated with the printing data, the controlling of the strobe time-width being not only responsive to the current temperature of said thermal head but also responsive to magnitudes of voltage and current of a power source used for heating said thermal head.

The controlling of the printing-strobe time-width responsive to the current temperature of said thermal head and responsive to the magnitudes of voltage and current of a power source results in the strobe-time controlling being carried out properly using information concerning the variation in the energy supplied to the thermal head. As a result, it is possible to prevent the printing data from being unnecessarily thinned out due to the increase in the thermal head temperature.

Other objects and further features of the present invention will become more apparent from the following detailed description when read in conjunction with the accompanying drawings.

DESCRIPTION OF THE PREFERRED EMBODIMENTS

Figure 1:
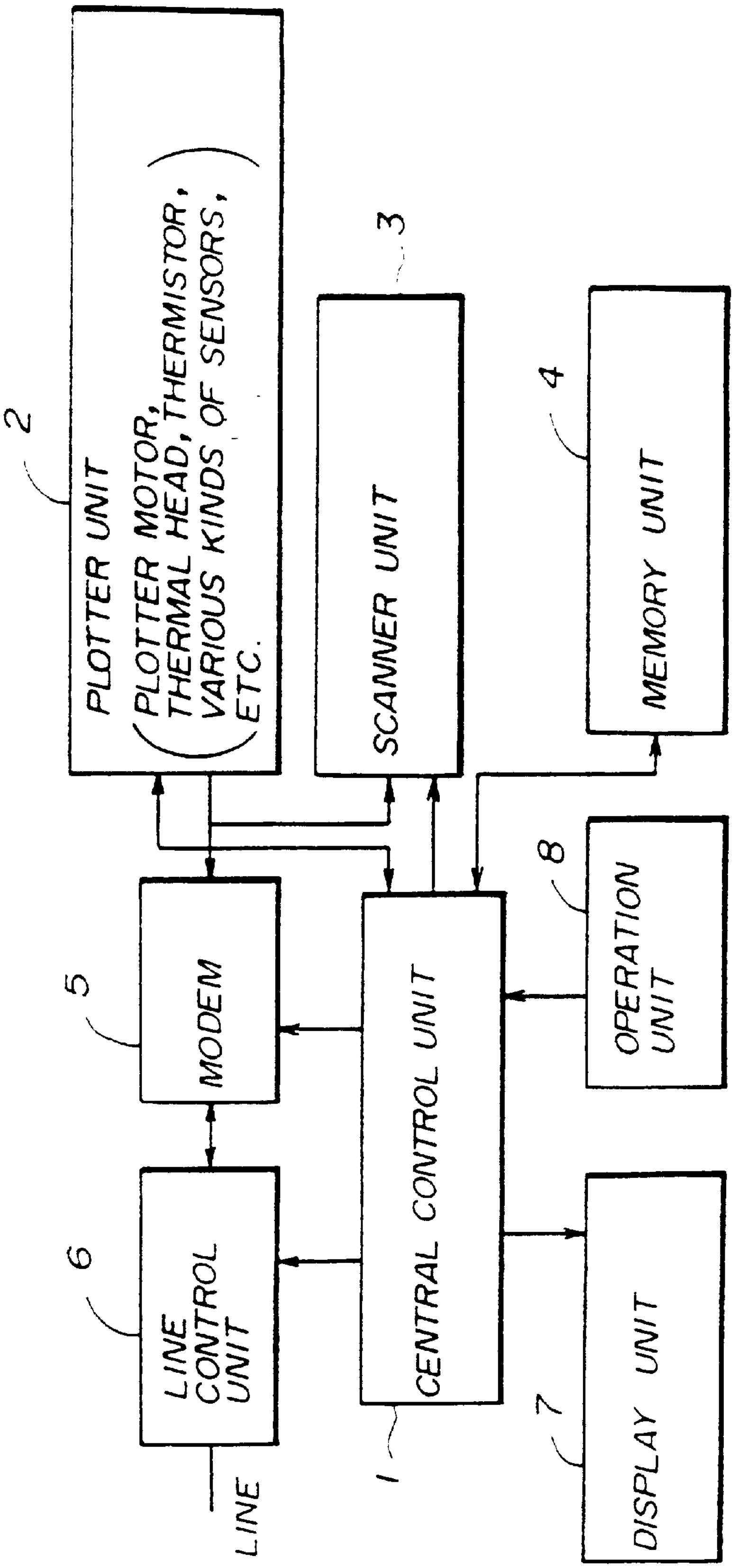
FIG. 1 hows one example of a block diagram of a facsimile apparatus of first, second, third and fourth embodiments according to the present invention.

An example of a block diagram of a facsimile apparatus of first, second, third and fourth embodiments according to the present invention will now be described.

The facsimile apparatus comprises a system control unit or central control unit 1 having a ROM comprising a control program and having a RAM to be used in the control operation performed by the control unit 1. The facsimile apparatus also comprises a plotter unit 2 for printing an image according to received data a, the plotter unit 2 comprising, for example: a sensor unit for detecting a condition of a recording paper; a thermal head for directly printing the image; a thermistor for detecting the temperature of the thermal head; a motor for feeding the recording paper in the facsimile apparatus. The facsimile apparatus further comprises a scanner unit 3 for reading an image to be transmitted to another facsimile apparatus. The facsimile apparatus further comprises a memory unit 4 for storing read data and/or a received data; and a modem 5 for modulation and/or demodulation of data to be transmitted and/or received data. The facsimile apparatus further comprises a line control unit 6 comprising a network control device and a display unit 7 for displaying information concerning the control operation performed in the facsimile apparatus. The facsimile apparatus further comprises an operation unit 8 by which an operator specifies the operation to be executed by the facsimile apparatus.

An operation flow of a printing control system used in the facsimile apparatus of the first embodiment according to the present invention will now be described with reference to FIG. 3.

If a result of a step S1 (the term step will be omitted so that, for example, the step S1 will be referred to as simply S1, hereinafter) is YES, that is, if data received and then stored in the memory unit 4 exists, and also if a result of S2 is NO, that is, if the current temperature of the thermal head is neither equal to nor above a predetermined value, one line of the stored data is printed in S3. One line of the stored data corresponds to one line of the previously read relevant image data. If a result of S4 is YES, that is, if the data reception is finished, and also if a result of S5 is NO, that is, if no data received and then stored in the memory unit 4 exists, the operation flow of the current cycle is finished. If a result of S1 is NO or if a result of S2 is YES, then S4 is executed. Further, if a result of S5 is YES, then S2 is again carried out.

If a result of S4 is NO, that is, if the data reception is not yet finished, and if a result of S6 is NO, that is, if one line of data is not received, then Si is again carried out. If a result of S6 is YES, that is, if one line of data is received, then S7 is carried out. If a result of S7 is YES, that is, the current temperature of the thermal head is equal to or above the predetermined value, which temperature is detected by the thermistor in the plotter unit 2, then data being received is once stored in the memory unit 4, in S8. The thus stored data is printed in S9 after the current temperature of the thermal head becomes less than the predetermined value, that is, the result NO in S7. Thus, the received data is stored in the memory unit 4 while the temperature of the thermal head is equal to or above the predetermined value, and simultaneously the printing speed rate may be substantially controlled. As a result, an increase in the temperature of the thermal head is controlled while the printing work is carried out.

In the above mentioned operation flow, the operation of the printing strobe is halted when the temperature of the thermal head reaches the predetermined value. As a result, the increase of the thermal-head temperature is controlled while the printing speed rate is correspondingly substantially deteriorated.

An essential part of an operation flow of a printing control system used in the facsimile apparatus of the second embodiment according to the present invention will now be described with reference to FIG. 4.

If a result of S11 is YES, that is, if the thermal-head temperature is equal to or above the predetermined value, received data is not used to print a corresponding image but is instead once stored in the memory unit 4 in S12. The thus stored data is used to print the corresponding image in S13 after the thermal-head temperature is lowered, that is, after the result of S11 becomes NO. In this case, if the printing work were continued even though the thermal-head temperature is equal to or above the predetermined value, data thinning out would be imposed on the received data before this data was used to print the corresponding image so as to reduce the load borne by the thermal head.

Figure 4:
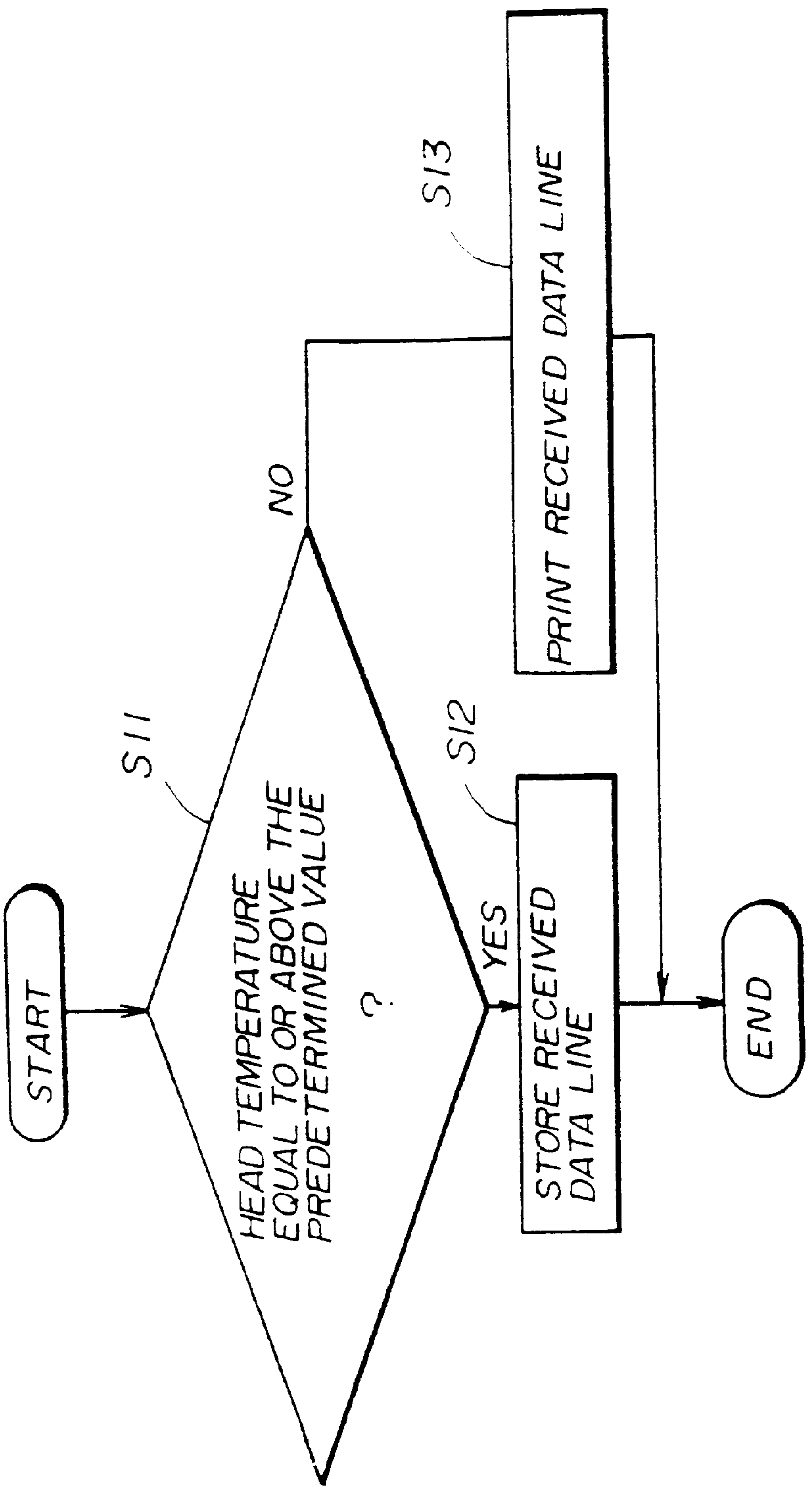
FIG. 4 shows an essential part of an operation flow of a printing control system of the second embodiment according to the present invention.

In the operation flow of FIG. 4, the starting of the printing work, after it is halted in the case where the result of S11 is YES, is carried out due to the lowering of the thermal-head temperature. However, this starting of the printing work may instead be carried out based on a printing ratio, described below, associated with the subsequent line data instead of due to the lowering of the thermal-head temperature. The printing ratio is a ratio of an area in a unit area on a recording sheet on which a change of color is to be performed to another area on which a change of color is not to be performed as a result of a printing work being performed on the unit area on the recording sheet.

An operation flow of a printing control system used in the facsimile apparatus of the third embodiment according to the present invention will now be described with reference to FIGS. 5A and 5B.

Figure 3:
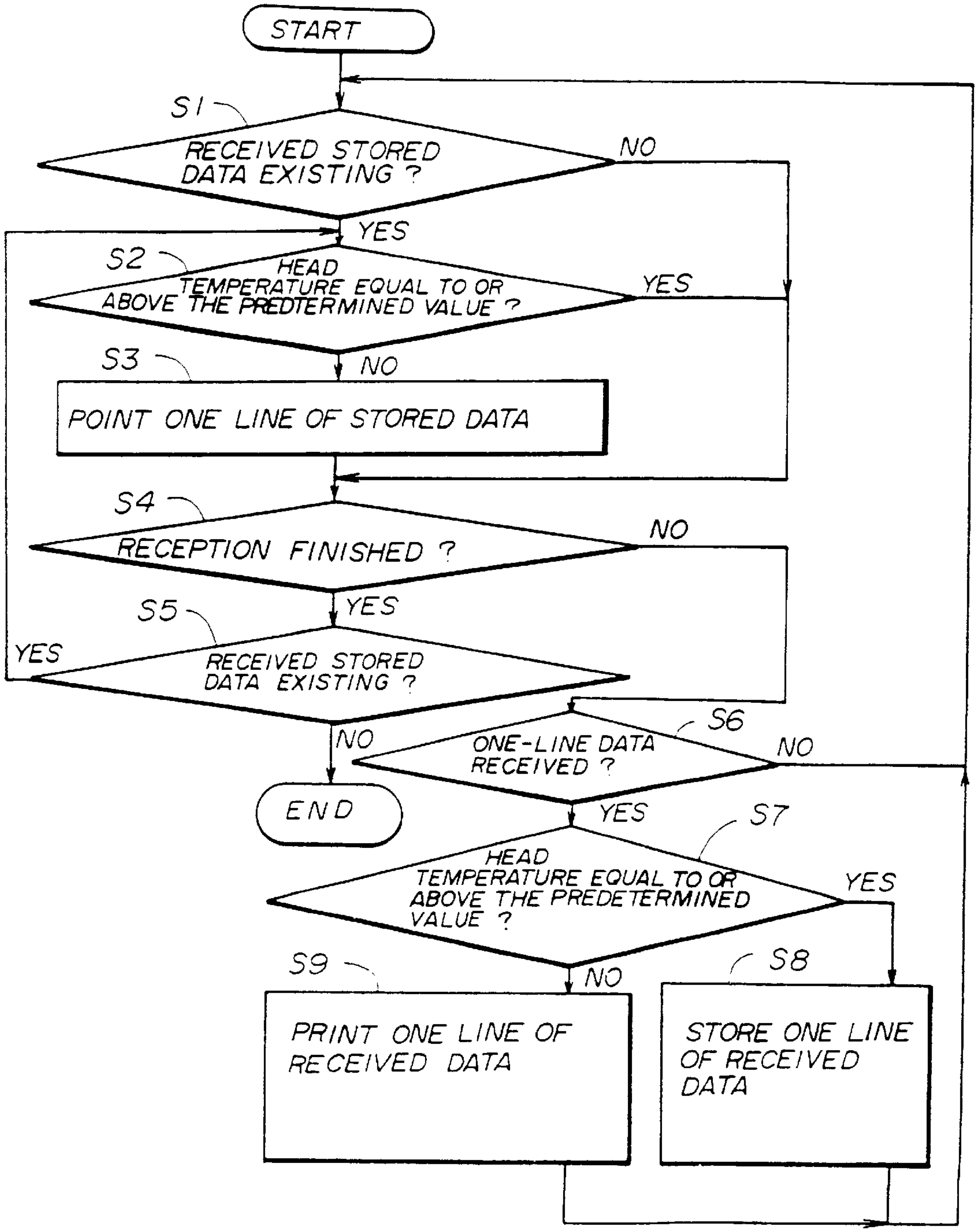
FIG. 3 shows an operation flow of a printing control system of the first embodiment according to the present invention.
Figure 5A:
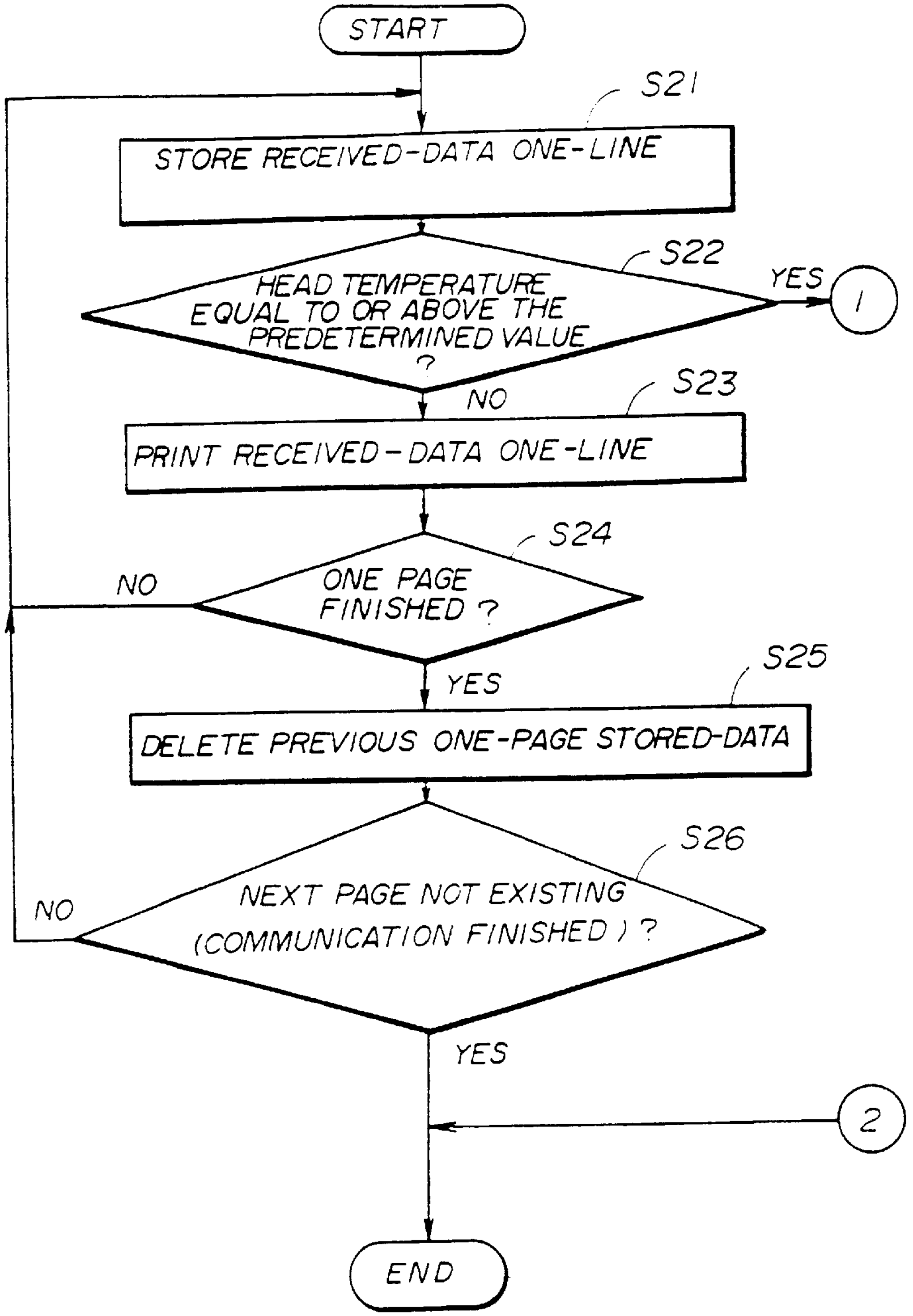
FIGS. 5A and 5B show an operation flow of a printing control system of the third embodiment according to the present invention.
Figure 5B:
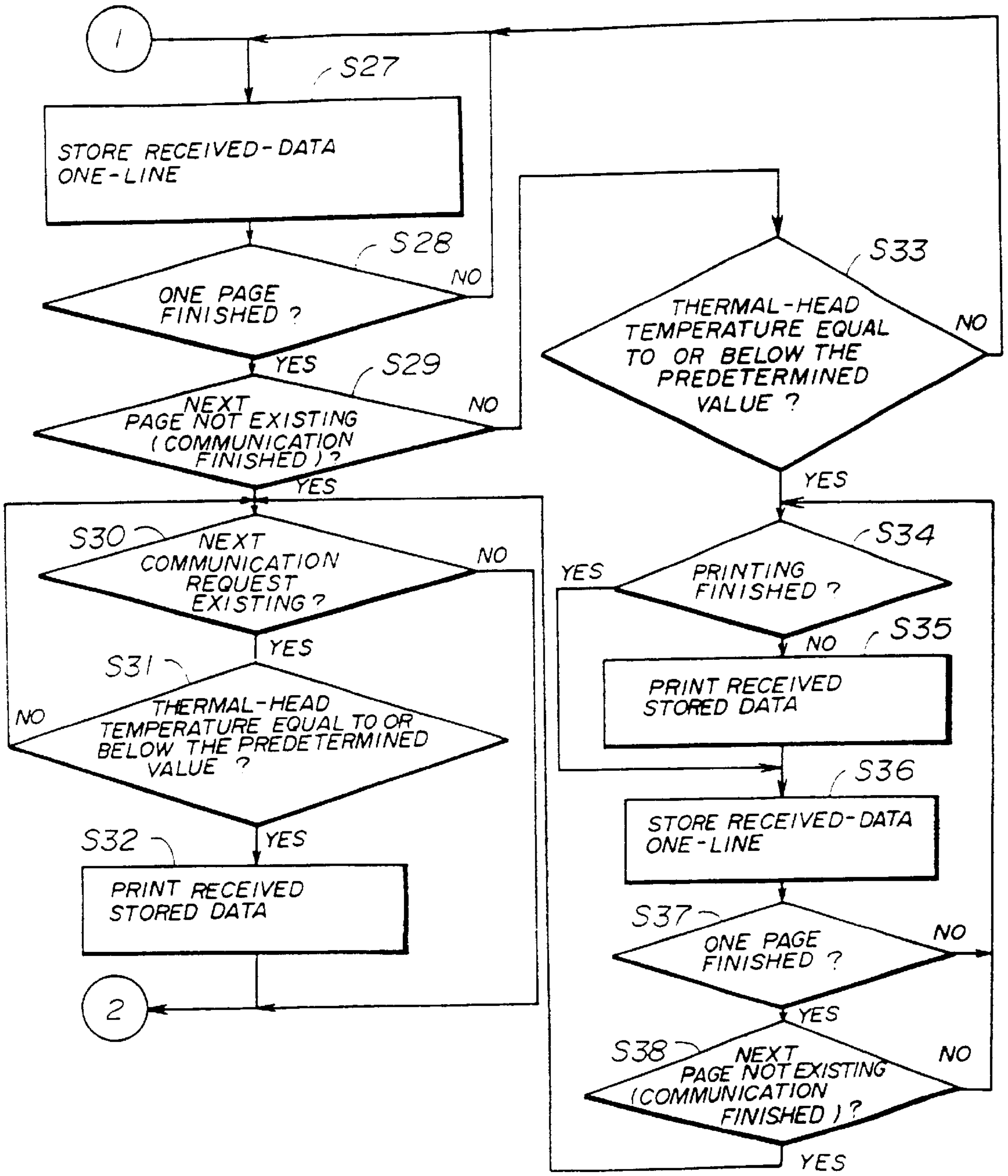

The printing control system of FIGS. 5A and 5B is similar to that of FIG. 3. However, in the system of FIGS. 5A and 5B, the page of the received data is again printed out if the thermal-head temperature becomes equal to or above the predetermined value while the relevant page is first being printed out. Thus, the printing quality of the relevant page is improved even though intermittent printing work, due to the printing work being frequently halted in order to control the thermal-head temperature, deteriorating the printing quality of the first printed page.

In FIGS. 5A and 5B, if the result of S22 in FIG. 5A is YES, S27 of FIG. 5B is then executed, and if the result of S30 is NO or after S32 is executed in FIG. 5B, then the current cycle of the operation flow is ended.

In the operation flow of FIGS. 5A and 5B, the one line of the received data is once stored in the memory unit 4 in S21. Then, if the thermal-head temperature is neither equal to nor above the predetermined value, that is, if a result of S22 is NO, the thus once stored one line of the received data is used to print the corresponding one line of the image in S23. Then, if one page of the received data is printed out, that is, if a result of S24 is YES, the above-mentioned once stored received data is deleted in S25. Then, if another page of received data exists (YES in S26), that is, if the relevant facsimile communication is finished, the current cycle of the operation flow is finished.

If the thermal-head temperature is equal to or above the predetermined value (YES in S22), another line of the received data is then stored in the memory unit 4 in S27. Then, if storage of the page of the received data is completed (YES in S28) as a result of repeated storage of the lines of the received data in S27, S29 is carried out. Then, if no other page of received data exists (YES in S29), that is, if the relevant facsimile communication is finished, S30 is then executed. In S30, it is determined whether or not there exists a next communication request. If a next communication request exists (YES in S30), then it is determined in S31 whether or not the thermal-head temperature is equal to or below the predetermined value. If the result of S31 is YES, that is, if the thermal-head temperature is not more than the predetermined-value, the above-mentioned stored data is then used to print the corresponding image in S32.

If another page of received data exists (NO in S29), it is determined in S33 whether or not the thermal-head temperature is equal to or below the predetermined value. If the temperature is equal or below the predetermined value (YES in S33), it is determined in S34 whether or not the printing out of the received data is finished. If the printing out of the received data is not yet finished (NO in S34), the data received and then stored is used to print the corresponding image in S35. Then, one line of received data is stored in the memory unit 4 in S36. Then, if storage of one page of the received data is finished (YES in S37) as a result of repeated storage of lines of the received data in S36, S38 is then carried out. In S38, it is determined whether or not another page of received data exists. If no other page of received data exists (YES in S38), that is, the relevant facsimile communication is finished, then S30 is carried out.

An operation flow of a printing control system of the facsimile apparatus according to the fourth embodiment of the present invention will now be described with reference to FIG. 6.

Figure 6:
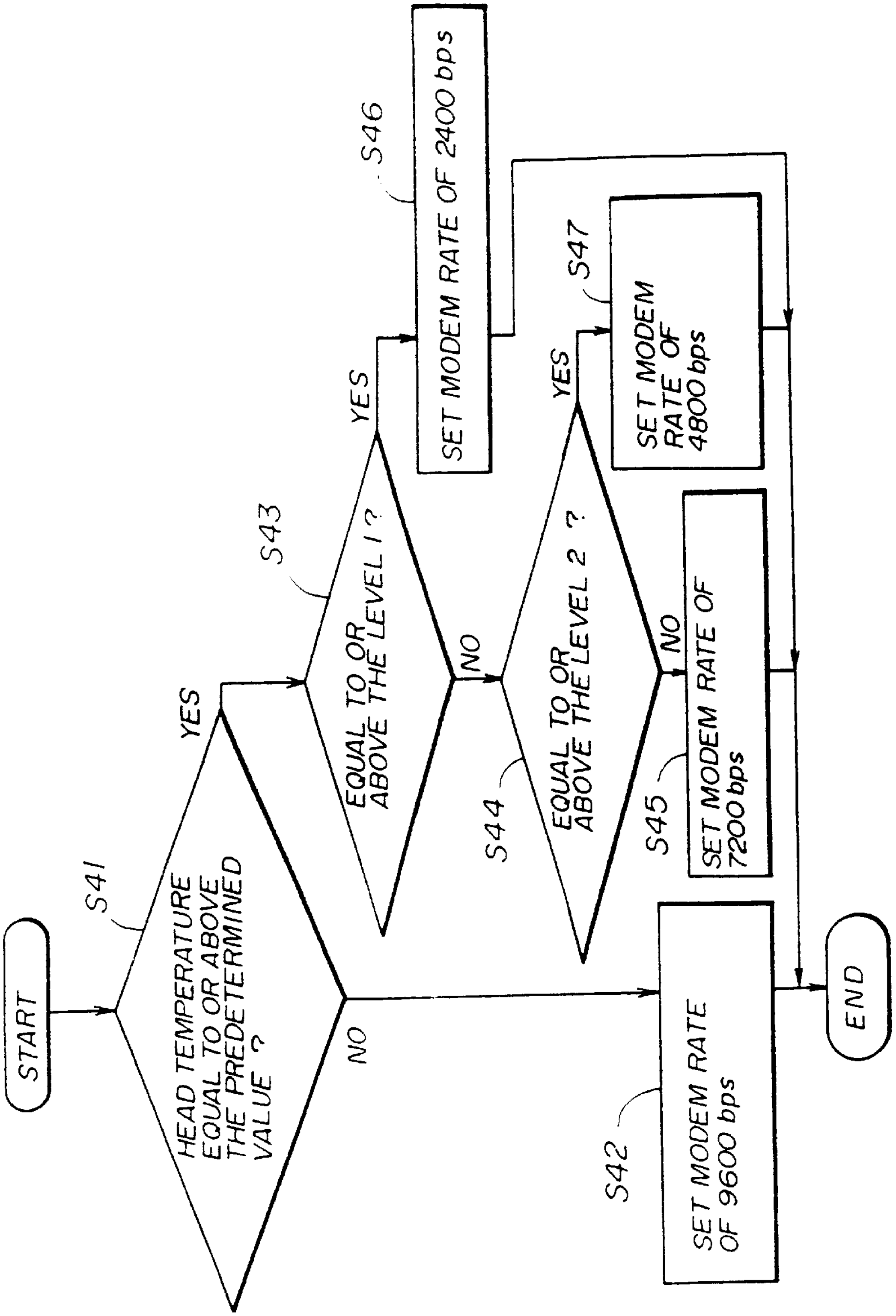
FIG. 6 shows an operation flow of a printing control system of the fourth embodiment according to the present invention.

The printing control system of FIG. 6, in order to carry out a printing work with the controlled temperature of the plotter unit 2, causes another facsimile apparatus to send printing data at a transmission speed rate controlled appropriately. The transmission speed is controlled as a result of the facsimile apparatus, which will receive the printing data, sending information concerning the communication modem rate corresponding to the controlled transmission speed rate to the other facsimile which will send the printing data. The sending of this information is carried out before the facsimile apparatus, which will receive the printing data, receives the printing data. The degree of controlling the transmission speed rate depends on the current temperature of the plotter unit 2.

In FIG. 6, if the thermal-head temperature is neither equal to nor above the predetermined value (NO in S41), a modem rate of 9600 bps is set (in S42) and then the current cycle of the operation flow is finished. If the thermal-head temperature is equal or above the predetermined value (YES in S41), it is determined in S43 whether or not the level of the thermal-head temperature is equal to or above a predetermined level 1. If the temperature level is equal to or above the predetermined level 1 (YES in S43), a modem rate of 2400 bps is set (in S46) and then the current cycle of the operation flow is finished. If the relevant temperature level is neither equal to nor above the level 1 (NO in S43) but if the temperature level is equal to or above a predetermined level 2 (YES in S44), a modem rate of 4800 bps is set (S47) and then the current cycle of the operation flow is finished. If the relevant temperature level is neither equal to nor above the level 2 (NO in S44), a modem rate of 7200 bps is set (S45) and then the current cycle of the operation flow is finished.

A protocol sequence of the facsimile apparatus of a fifth embodiment according to the present invention will now be described with reference to FIG. 2. The abbreviations in FIG. 2 will now be described, and it may be helpful for understanding in detail to refer to Index of abbreviations used in Recommendation T.30, Appendix II to CCITT (International Telegraph and Telephone Consultative Committee) Recommendation T.30.

Tx.: Transmitter;

Rx.: Receiver;

CNG: Calling tone;

CED: Called station identification;

NSF: Non-standard facilities;

CSI: Called subscriber identification;

DIS: Digital identification signal;

NSS: Non-standard set-up;

TSI: Transmission subscriber identification;

DCS: Digital command signal;

TCF: Training check;

CFR: Confirmation to receive;

NG: indicating erroneous frame;

PPS: Partial page signal (indicating an end of an entire page or a partial page associated with facsimile information);

EOP: End of procedure;

PPR: Partial page request (indicating that the premessage has not been received properly and specifying a frame, a correction being necessary to be made to a facsimile information field associated with the frame);

MCF: Message confirmation;

DCN: Disconnect; and

PIX: Pixel information.

Figure 2:
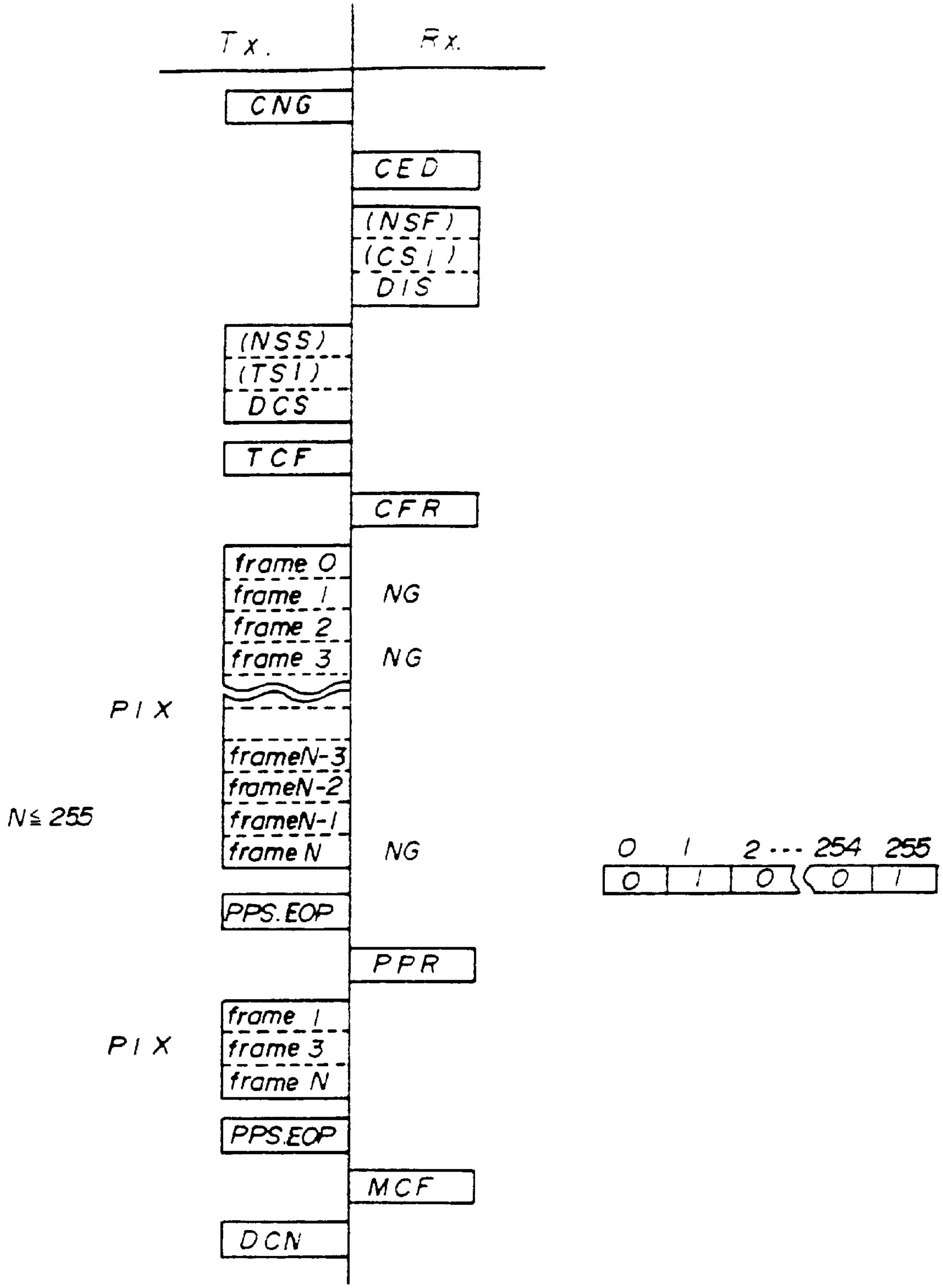
FIG. 2 illustrates an error-correction-mode protocol sequence used for description of the facsimile apparatus of a fifth embodiment according to the present invention.

In the data transmission example shown in FIG. 2, frames 1, 3 and N (or 255) are erroneous frames. As a result, only these frames are retransmitted as shown in FIG. 2. An operation according to the fifth embodiment of the present invention will now be described. In the operation, further to the above-mentioned operation in the above example, frames, which are not always erroneous frames, may be retransmitted so as to allow a time during which the overheated thermal head may be cooled as described below.

The facsimile apparatus of the fifth embodiment has a function of an error correction mode (this term will be abbreviated ECM hereinafter) in which the facsimile apparatus, which has received printing data erroneously, request the other facsimile apparatus which has sent the printing data to send the printing data of the frames thereof again, which frames to be sent again starting from a frame which has the error. There, the apparatus sending the printing data may send a number of data frames once, which number should be within a predetermined number. The above predetermined number depends on a capacity of a buffer which the apparatus receiving the printing data has. The apparatus receiving the printing data informs to the other apparatus as to which data frames, among the once sent number of data frames, are to be sent again. The facsimile apparatus of the fifth embodiment, in order to control the printing speed rate so as to control the thermal-head temperature, sends information concerning the frame, a group of frames, starting at which frame, should be sent again, to the other facsimile apparatus which sent the printing data. The frame information which is sent as mentioned above may comprise not only the frame really having an error but also a frame not really having any error for the purpose of controlling the printing work speed.

An example of such an operation as in a case where printing data is received in ECM will now be described. In this example, a plurality of pages of image data is sent in one communication connection session (such a function may be called multi-receiving). If the thermal-head temperature reaches a predetermined value when the last part of the page of the printing data is printed out, the printing work is continued without regard to whether the relevant temperature has reached the predetermined value. This predetermined value is a value such that, after the thermal-head temperature reaches the value, a predetermined data thinning-out printing manner is normally applied to the printing work. Then, another page of printing data is not received, and, in order to have the time required for lowering the relevant thermal-head-temperature, the last group of frames of the previous received printing data is sent again.

Similarly to the above case but where the thermal-head temperature attains a second predetermined value lower than the above-mentioned predetermined value for the data thinning-out printing manner, the second predetermined value being a rather high thermal-head temperature, a next page of printing data is not received immediately even though there is not a real error in the received data. Instead, the number of frames, which number is controlled to correspond to the magnitude of the current thermal-head temperature, is sent again in order to have the time required to lower the thermal-head temperature. Such an operation will also be performed if the rising thermal-head temperature phenomena occurs when the intermediate part of the page is printed out. That is, the printing operation is continued, until the printing out of the relevant page has been finished, without performing the data thinning-out measure.

There, the re-sent frames of printing data are ignored when those frames of printing data includes no erroneous frame. On the other hand, if the re-sent frames of printing data include an erroneous frame, the printing operation was stopped when the relevant erroneous frame was found. Then, the re-sent frames of printing data are used to start printing out a part of the relevant image, this part to be printed starting from a position which the erroneous frame corresponds to.

Though the number of frames to be sent again is controlled so as to appropriately control the time for halting the printing work in the above description, another method may be used for accomplishing the same purpose. That is, instead of controlling the number of frames to be sent again, a length of each frame to be sent again may be controlled, according to the thermal-head temperature when a data receiving process is started. In one example of controlling a frame length, a frame length of 256 bites is controlled to become 64 bites. How the re-sent controlled-length frames of printing data are handled is similar to the manner as mentioned above regarding the manner in which the re-sent not-controlled-length frames are handled.

A control manner of a thermal printing system of a sixth embodiment according to the present invention will now be described. The thermal printing system of the sixth embodiment uses a portable power source for the power source of the system. The portable power source is a power source currently used in so-called note-book type small personal computers. Such a power source comprises a portable converter for converting household-use alternating current power into direct current power.

Figure 7:
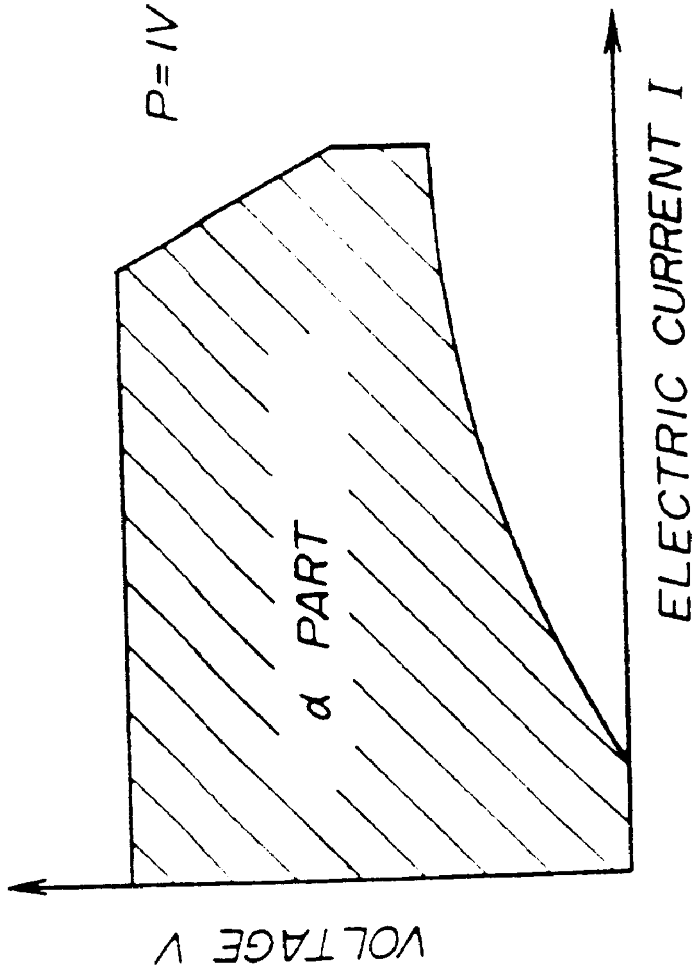
FIG. 7 shows characteristics of energy required for Data printing.

The portable power source has electric current-voltage (referred to I–V hereinafter) characteristics such as shown in FIG. 7. In FIG. 7, an a part shown by hatching with oblique lines indicates an area within which the combination of the voltage and electric current values may lie. Such characteristics are determined as a result of a design of the power source which achieves a proper protection of the power source in a case where the power source is short-circuited for a certain reason. In such a short-circuit condition, which makes the voltage V approximately 0, the electric current I is reduced (preferably the electric current I should be absolutely zero) so as to stop the power supply thereby.

In the thermal printing system having such characteristics as shown in FIG. 7 to a remarkable degree, that is, those shown in FIG. 7, the same printing pulse time-width (for which an electric current flows through the thermal head)

being input to the thermal printing system actually results in printing densities which vary in accordance with the electric-current value. This is because the variation in the electric-current value results in the variation in energy ($P=IV=IR^2$, where I is the electric current, V is the voltage, and R is the resistance of the thermal head) used for printing out printing data.

In the thermal printing system of the sixth embodiment according to the present invention, the printing pulse width used for heating the thermal head so as to print data is determined using not only the thermal-head temperature at a printing time but also a printing ratio, such as mentioned above, associated with the line printing data to be printed out or the actual electric-current value.

In the case where the printing ratio is used to determine a printing pulse width, a printing ratio associated with each block of line printing data is used. In an example of this case, when an entire line of printing data is printed out at one time, a printing ratio associated with an entire line of printing data is used. In a case where a line of printing data is printed out two times as a result of dividing the entire line into two blocks, two printing ratios associated respectively with the two blocks are used.

Further, it is possible to make a determination, after taking into account such conditions, as to whether or not printing data is to be thinned out so as to prevent over-heating of the thermal head. That is, the above-mentioned determination may be made after taking into account not only a thermal-head temperature but also a printing ratio associated with the relevant printing data and an electric current required for heating the thermal head during printing out the relevant printing data. As a result, the data thinning out may be reduced so that such data thinning out measure is taken only in a case where this measure is absolutely necessary. Thus, the data loss phenomena can be effectively reduced.

In the thermal printing system of the sixth embodiment of the present invention, by taking into account not only a thermal head temperature but also taking into account the power-source voltage and electric current, variation in strobe energy for a constant period of time can be determined so that an appropriate printing pulse width control can be then realized.

Further, in the thermal printing system of the sixth embodiment of the present invention, the power-source voltage and electric current can be determined by using a printing ratio of line printing data so that an appropriate printing pulse width control can be realized.

Further, in the thermal printing system of the sixth embodiment of the present invention, determination as to whether or not a data thinning out measure is to be taken is made using information concerning the power-source voltage and electric current. As a result, the data thinning out may be effectively reduced so that such data thinning out measure is taken only in a case where this measure is absolutely necessary.

Further, the present invention is not limited to the above described embodiments, and variations and modifications may be made without departing from the scope of the present invention.

What is claimed is:

1. A thermal printing system comprising:

detecting means for detecting a current temperature of a thermal head which is used to print information associated with printing data; and transfer controlling means for reducing a data transfer rate, at which said printing data is transferred from outside to said thermal printing system, if the current temperature of said thermal head is in a predetermined range.

2. The thermal printing system according to claim 1, wherein said thermal printing system further comprises a control means for reading, before the printing information is transferred, information concerning the current temperature of said thermal head, said information to be read being provided by said detecting means, wherein said control means causes said transfer control means to reduce the data transfer rate if the current temperature of said thermal head is in said predetermined range.

3. The thermal printing system according to claim 1, wherein:

said thermal printing system comprises a facsimile apparatus for receiving the printing data transferred by another facsimile apparatus; and said transfer control means causes said other facsimile apparatus to reduce a transfer rate of the printing data if the current temperature of said thermal head is in said predetermined range.

* * * * *